United States Patent [15] 3,689,699

Brenig et al. [45] Sept. 5, 1972

[54] SYNCHRONIZING SYSTEM

[72] Inventors: Theodore Brenig; James S. Smith, Jr.; Paul E. Woodie, Jr., all of Lynchburg, Va.

[73] Assignee: General Electric Company

[22] Filed: April 12, 1971

[21] Appl. No.: 133,194

[52] U.S. Cl. ..........................179/15 BS, 178/69.5 R

[51] Int. Cl. ..........................H04j 3/06

[58] Field of Search 340/347 DD; 179/15 AP, 15 BW, 179/15 BS; 178/69.5 R; 325/38 A

[56] References Cited

UNITED STATES PATENTS

| | | | |
|---|---|---|---|
| 3,550,082 | 12/1970 | Tong | 179/15 BS |
| 3,555,195 | 1/1971 | Rester | 179/15 BS |
| 3,623,078 | 11/1971 | Whiting | 340/347 DD |

*Primary Examiner*—Ralph D. Blakeslee
*Attorney*—James J. Williams, Frank L. Neuhauser, Oscar B. Waddell and Joseph B. Forman

[57] ABSTRACT

In a time-division multiplex, pulse-code modulation system, each sequence of four binary pulses representing information are converted to a group of three ternary pulses for transmission to a receiver. At the receiver, the same groups of three ternary pulses are converted back to four binary pulses for decoding and demultiplexing. Both conversions are made in accordance with a code in which three ternary zeros do not appear in any correct ternary grouping. If the receiver is out of frame, a condition which can be indicated by framing binary pulses, the receiver sends an alarm to the distant transmitter to cause the distant transmitter to send a special distinguishing code in place of the information. This distinguishing code produces a large number of three ternary zeros in sequence. If, at the receiver, three zeros appear in a ternary pulse group, the grouping is shifted until no group contains three ternary zeros. The distinguishing code also makes the framing binary pulses distinct so that binary framing is made rapidly and accurately. When the receiver is in frame, the alarm signal is removed so that the distant transmitter sends voice information again.

8 Claims, 7 Drawing Figures

PATENTED SEP 5 1972 3,689,699

SHEET 1 OF 7

INVENTORS:
THEODORE BRENIG
JAMES S. SMITH, JR.
PAUL E. WOODIE, JR.

James J. Williams
THEIR ATTORNEY.

INVENTORS:
THEODORE BRENIG
JAMES S. SMITH, JR.
PAUL E. WOODIE, JR.
James J. Williams
THEIR ATTORNEY

FIG. 3

BINARY – TERNARY (4-3) CONVERSION CODE

| BINARY GROUP | TERNARY GROUP | | POLARITY WEIGHT |
|---|---|---|---|
| | POSITIVE MODE | NEGATIVE MODE | |
| 0000 | 0 + 0 | 0 − 0 | 1 |
| 0001 | + 0 0 | − 0 0 | 1 |
| 0010 | + − 0 | + − 0 | 0 |
| 0011 | − + 0 | − + 0 | 0 |
| 0100 | 0 + − | 0 + − | 0 |
| 0101 | + + + | − − − | 3 |
| 0110 | + − + | − + − | 1 |
| 0111 | − 0 + | − 0 + | 0 |
| 1000 | 0 0 + | 0 0 − | 1 |
| 1001 | − + + | + − − | 1 |
| 1010 | + + 0 | − − 0 | 2 |
| 1011 | 0 + + | 0 − − | 2 |
| 1100 | + 0 − | + 0 − | 0 |
| 1101 | + 0 + | − 0 − | 2 |
| 1110 | + + − | − − + | 1 |
| 1111 | 0 − + | 0 − + | 0 |

POSITIVE MODE IS USED IF PRIOR NET POLARITY WEIGHT IS NEGATIVE
NEGATIVE MODE IS USED IF PRIOR NET POLARITY WEIGHT IS ZERO OR POSITIVE

INVENTORS:
THEODORE BRENIG
JAMES S. SMITH, JR.
PAUL E. WOODIE, JR.
James J. Williams
THEIR ATTORNEY INVENTORS:
THEODORE BRENIG,
JAMES S. SMITH, JR.
PAUL E. WOODIE, JR.
BY James J. Williams
THEIR ATTORNEY.

INVENTORS:

THEODORE BRENIG

JAMES S. SMITH, JR.

PAUL E. WOODIE, JR.

James J. Williams

THEIR ATTORNEY.

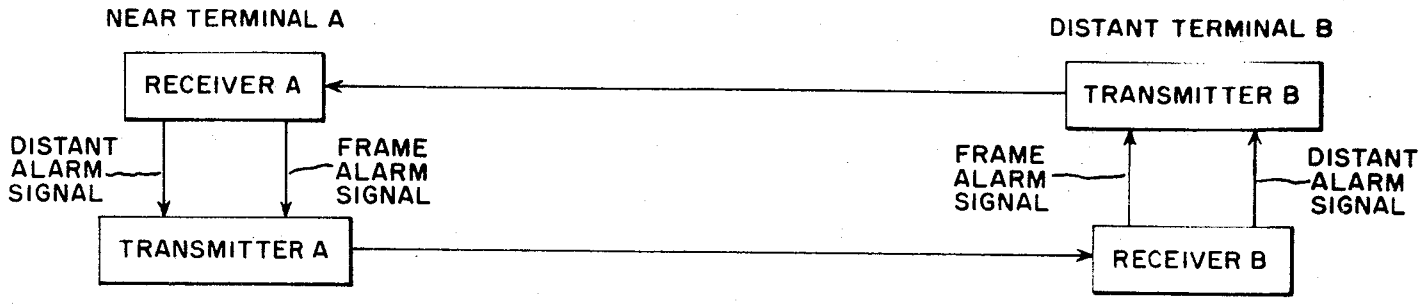

| STATE OF RECEIVER A | OUTPUT OF TRANSMITTER A | STATE OF RECEIVER B | OUTPUT OF TRANSMITTER B |
|---|---|---|---|
| OUT OF FRAME; PRODUCES FRAME ALARM SIGNAL | DISTINGUISHING CODE IN CH. 1–36 AND ALARM SIGNAL IN CH. 37 | OUT OF FRAME; PRODUCES FRAME ALARM SIGNAL | DISTINGUISHING CODE IN CH. 1–36 AND ALARM SIGNAL IN CH. 37 |
| OUT OF FRAME; PRODUCES FRAME ALARM SIGNAL | DISTINGUISHING CODE IN CH. 1–36 AND ALARM SIGNAL IN CH. 37 | IN FRAME; RECEIVES DISTANT ALARM SIGNAL IN CH. 37 | DISTINGUISHING CODE IN CH. 1–36 AND STANDARD CH. 37 |
| IN FRAME | STANDARD SUPERFRAME | IN FRAME | STANDARD SUPERFRAME |

FIG. 6

INVENTORS:
THEODORE BRENIG,
JAMES S. SMITH, JR.
PAUL E. WOODIE, JR.
BY James J. Williams
THEIR ATTORNEY.

SYNCHRONIZING SYSTEM

CROSS-REFERENCE TO RELATED APPLICATIONS

This application describes an invention which is particularly useful in a time-division multiplex, pulse-code modulation system as described and claimed in a patent application entitled "Improved Communication System Using Time-Division Multiplexing and Pulse-Code Modulation," filed Feb. 1, 1971, Ser. No. 111,436, and assigned to the General Electric Company.

BACKGROUND OF THE INVENTION

Our invention relates to an improved synchronizing system for a time-division multiplex, pulse-code modulation system, and particularly to such a synchronizing system for correctly grouping received ternary pulses for conversion to binary pulses, and for framing the binary pulses so provided.

Communication systems using time-division multiplexing and pulse-code modulation are used to provide a plurality of relatively low-noise, easily regenerated communication channels over a single communication circuit. Such systems are described in considerable detail in a book entitled "Transmission Systems for Communications," by Members of the Technical Staff, Bell Telephone Laboratories, Fourth Edition, 1970. One such system, designated the T–1 System by the Bell Telephone System, is used extensively for local transmission in large cities. The T–1 System provides 24 channels over two pairs of wires, one pair of wires being used for each direction of transmission. While the T–1 System provides good utilization of existing cable pairs, it still does not meet the presently increasing demands for telephone service, particularly in the large cities of the United States. In order to meet these demands, telephone companies are now considering the addition of more cables to provide additional circuits. Such additional cables represent a large financial outlay; and, in some cities, are almost out of the question because of the congestion and limited space available for such cables, and the resultant high construction costs.

In order that more telephone circuits can be provided over the same cable pairs, a new time-division multiplex, pulse-code modulation system has been devised. This newer system is designated the TCS–27 Pulse Code Modulation Carrier System, and is described in the patent application referred to above. The TCS–27 system uses time-division multiplexing and pulse-code modulation of 36 channels for voice, and a separate 37th channel for signalling, alarms, and framing. Each of the 36 voice channels is amplitude-sampled 8,000 times per second, and the samples are time-division multiplexed. The amplitude of each of the multiplexed samples is then encoded by seven binary pulses. Five binary pulses representing signalling, alarms, and framing are multiplexed after each 252 pulses (36 voice channels times 7 pulses per channel) to complete one frame comprising 257 pulses. Twelve such frames comprise a super frame that represents: twelve amplitude samples of each of the 36 voice channels; one sample of each of the signals for the 36 channels; and also the alarm and framing signals. The binary pulses are applied to a binary-to-ternary converter which converts each sequence of four binary pulses to a group of three ternary pulses at a reduced pulse rate, so as to conserve the line bandwidth requirements. At the receiver, the ternary pulses are converted back to binary pulses for decoding and demultiplexing. Unlike other time-division multiplex, pulse-code modulation systems, such as the T–1 System which uses bipolar pulses that can be directly synchronized, the 36-channel TCS–27 system requires added synchronization so that each and every group of three ternary pulses (which is converted) corresponds with or contains the same three ternary pulses converted from four binary pulses by the transmitter. In other words, proper grouping of the ternary pulses at the receiver is essential. Otherwise, the information provided after the conversion to binary pulses, the decoding, and the demultiplexing will be unintelligible or useless. After the ternary pulses are correctly grouped and converted to binary pulses, the binary pulses must be correctly framed so that correct decoding and demultiplexing can be provided.

Accordingly, an object of our invention is to provide a new and improved synchronizing system for the ternary pulses of a time-division multiplex, pulse-code modulation system.

A relatively specific object of our invention is to provide a new system for rapidly grouping the received ternary pulses identically with the grouping of the transmitted ternary pulses in a 36-channel, TCS–27 Pulse Code Modulation Carrier System.

Another object of our invention is to provide a new system for causing a distant transmitter to send a distinguishing code that enables a receiver to rapidly and correctly frame the binary pulses to be decoded and demultiplexed.

Another object of our invention is to provide a new system for selectively causing a distant time-division multiplex, pulse-code modulation transmitter to send a distinguishing code that enables a receiver to rapidly and correctly group received ternary pulses for conversion to binary pulses, and to rapidly and correctly frame the binary pulses for decoding and demultiplexing.

SUMMARY OF THE INVENTION

Briefly, these and other objects are achieved in accordance with our invention by utilizing a distinguishing code which makes the framing signals in binary form appear distinct, and which has a relatively large number of three sequential zeros in ternary form. If the receiver fails to receive the binary framing signals at the proper time, it sends an alarm to its distant transmitter to cause the transmitter to send a special binary distinguishing code which, when converted to a ternary code, has a large number of three zeros in sequence. At the receiver, the ternary pulses are grouped in groups of three, and if three zeros appear in a group, the grouping is shifted by one ternary pulse. If three zeros subsequently appear in a group, the grouping is again shifted by one ternary pulse. After two such shifts, the grouping must be correct, and the proper ternary-to-binary conversion can then be made. After conversion from ternary pulses to binary pulses, the binary distinguishing code makes the framing signals distinct, so that framing can be quickly achieved. The proper grouping of the received ternary pulses can be quickly made (in approximately 70 microseconds) following the first detection of a grouping of three ternary zeros, and the proper framing can then be quickly made (in approximately 1.5 milliseconds).

BRIEF DESCRIPTION OF THE DRAWING

The subject matter which we regard as our invention is particularly pointed out and distinctly claimed in the claims. The structure and operation of our invention, together with further objects and advantages, may be better understood from the following description, given in connection with the accompanying drawing, in which:

FIG. 3 shows a table of the binary-ternary conversion code used in the system of FIG. 1;

FIG. 6 shows a functional block diagram of our synchronizing system; and

DESCRIPTION OF THE PREFERRED EMBODIMENT

Figure 1:
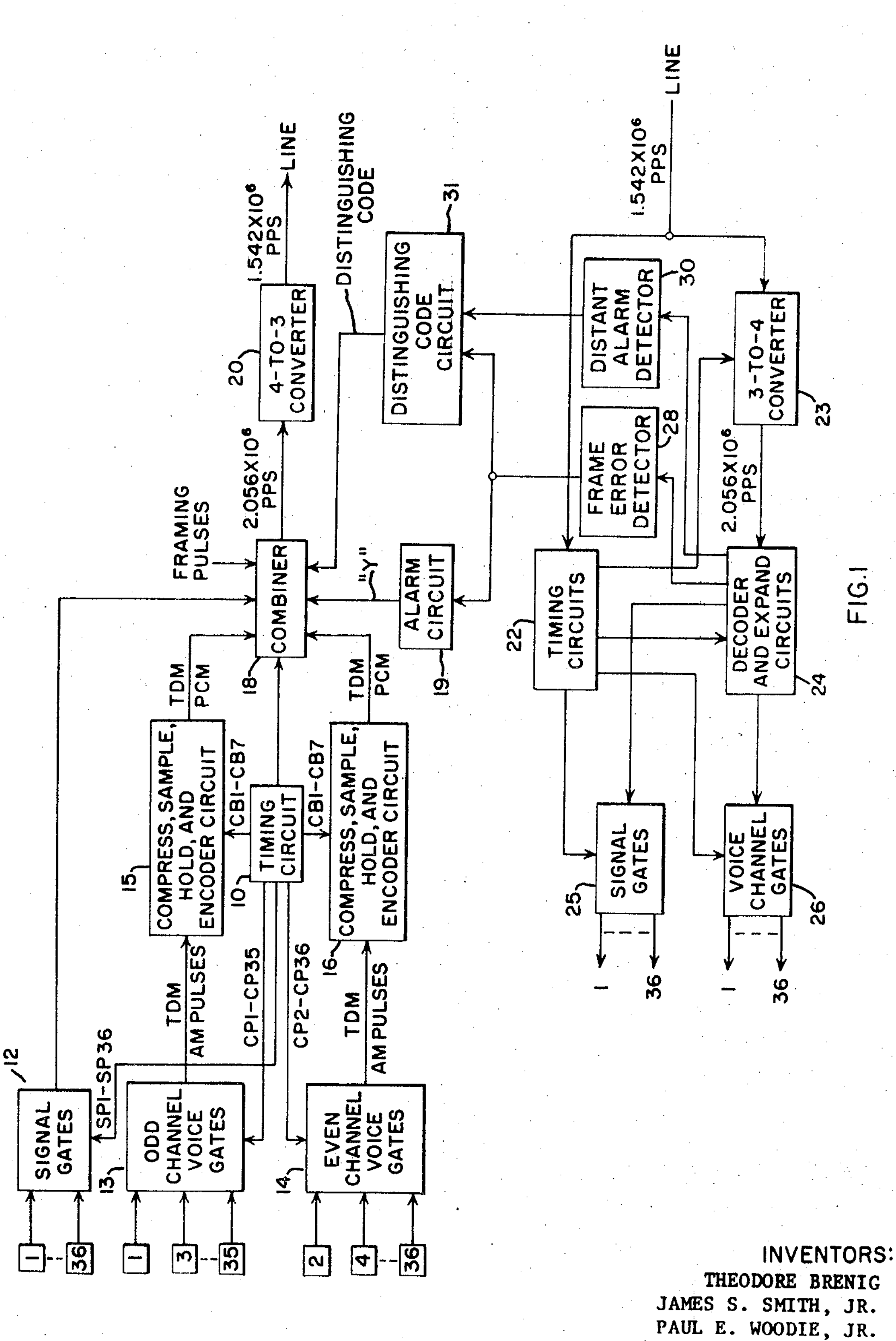
FIG. 1 shows a general block diagram of a time-division multiplex, pulse-code modulation transmitter and receiver in a TCS–27 system, and provided with a synchronizing system in accordance with our invention.

In the following description, we will first give a general description of the TCS–27 Pulse Code Modulation Carrier System with which our invention is intended to be used; and then give a detailed description of our synchronizing system.

TCS–27 PULSE-CODE MODULATION CARRIER SYSTEM

In the following description of the TCS 27 System, it has been assumed that the system is used with 36 voice channels. However, it is to be understood that almost any type of information can be transmitted by the 36 channels. Since a typical voice channel for telephone use has an upper frequency limit of about 4,000 Hertz, an amplitude-sampling rate of twice this, or 8,000 Hertz or pulses per second, has been selected in accordance with good engineering practice. Such a sampling rate ensures reasonably good fidelity and quality for ordinary telephone conversations. The TCS–27 System provides 36 voice channels, and one signalling, alarm, and framing channel. In order that each voice channel amplitude sample can be adequately represented, 128 different quantizing steps or amplitude levels are recognized. In binary codes, these 128 different amplitude levels require seven digits or bits. The first bit is the most significant, and represents an amplitude level of 64. The second through the sixth bits respectively represent amplitude levels of 32, 16, 8, 4, and 2. The seventh bit is the least significant, and represents an amplitude level of 1. The 37th channel for signalling, alarm, and framing, comprises 5 bits. Under these specifications, 8,000 samples/channel-second, multiplied by 7 bits/sample, multiplied by 36 channels (which represent 2,016,000 pulses or bits per second) plus 8,000 samples/channel-second, multiplied by five bits/sample, multiplied by 1 channel (which represent 40,000 pulses or bits per second) are required. This represents a total of 2.056 million pulses per second. Hence, the required basic clock or pulse-rate frequency is 2.056 million pulses per second.

As shown in FIG. 1, the TCS–27 System has a timing circuit 10 which supplies the basic clock or pulse frequency of 2.056 million pulses per second. In addition, the timing circuit 10 supplies other timed signals, including the following:

- Signalling pulses SP1 through SP36 for operating the 36 signal gates 12
- Channel pulses CP1 through CP36 for operating the odd and even channel voice gates 13, 14
- Framing pulses FP1 through FP12 for indicating each of the 12 frames of a super frame
- Channel bits CB1 through CB7 for indicating each of the seven bits which encode the voice channels or each of the five bits which encode the signalling, alarm, and framing channel.

Signalling, such as dialing or other information, is applied to the signal gates 12, and is gated through at an appropriate time by the signal pulses SP1 through SP36 to a combiner 18 for multiplexing. Since a relatively long time is required to encode each of the voice channels, two sets of voice gates 13, 14 are used, these being respectively designated the odd-channel voice gates 13 and the even-channel voice gates 14. These gates 13, 14 repetitively sample the information (amplitude) of the voice channels in sequence (1, 3, 5, etc. and 2, 4, 6, etc., respectively), each channel being sampled 8,000 times per second. The odd channels 1 through 35 are gated by the odd channel pulses CP1 through CP35 and the odd-channel voice gates 13 to an odd compress, sample, hold, and encoder circuit 15. In a similar manner, the even channels 2 through 36 are gated by the even channel pulses CP2 through CP36 and the even-channel voice gates 14 to an even compress, sample, hold, and encoder circuit 16. The signals applied to the circuits 15, 16 are time-division multiplex, amplitude-modulation pulses. In the circuits 15, 16, these pulses are compressed in accordance with conventional practice, to amplify or emphasize the lower signal amplitudes more than the higher signal amplitudes. However, it should be pointed out that such compression may be omitted. Each of the pulses is amplitude-sampled again, preferably at the end or during the last part of its respective first sample. Each of these second amplitude samples is held in a suitable time-delay circuit, and then encoded or quantized. That is, the amplitude of the held sample is measured or compared with respect to a reference level, and this measured level is then indicated by the 7 binary bits. For example, if the encoder recognizes 128 different amplitude levels (between 0 and 127), and if a held pulse has a measured level of 93 for example, this held pulse would be encoded as: 1 0 1 1 1 0 1. In this code, the first (and most significant) bit is a 1 which represents 64. The second bit is a 0 which represents the absence of 32. The third bit is a 1 which represents 16. The fourth bit is a 1 which represents 8. The fifth bit is a 1 which represents 4. The sixth bit is a 0 which represents the absence of 2. And the seventh (and least significant) bit is a 1 which represents 1. The numbers represented by a 1 total 93. The combiner 18, utilizing various timed signals from the timing circuit 10, combines these time-division multiplexed, encoded bits in the proper sequence beginning with Channel 1, and ending with Channel 36. After the Channel 36 coded pulses, five bits or pulses (representing signalling and alarm or framing) are then combined to provide a frame of 257 bits or pulses. This frame is repeated 8,000 times per second so that 257 multiplied by 8,000 or 2.056 million pulses per second are produced by the combiner 18. These pulses are then applied to a 4-to-3 converter 20 which converts the coded binary pulses having two levels (namely a 0 or 1) to coded ternary pulses having three levels (namely plus, zero, and minus). In this conversion, each successive group of four binary pulses is converted to three ternary pulses. Thus, the frequency of the ternary pulses is three-fourths the frequency of the binary pulses, or 1.542 million pulses per second. These ternary pulses are applied to the circuit or line, which typically comprises a pair of wires in a cable.

At the receiver, the ternary pulses are derived from a circuit or line and applied to timing circuits 22 which reproduce the basic pulse or clock frequency of 2.056 million pulses per second as well as other timing signals for use by various parts of the receiver. The incoming ternary pulses (at a rate of 1.542 million pulses per second) are also applied to a 3-to-4 converter 23 which converts the ternary pulses back to corresponding binary pulses. In this conversion, each successive group of three ternary pulses is converted to four binary pulses. This grouping must be synchronized with or must correspond to the grouping used at the distant transmitter in order to provide proper decoding. As will be subsequently explained, our invention enables this proper grouping to be quickly made. These binary pulses, which have a rate of 2.056 million pulses per second, are applied to decoder and expand circuits 24 which convert successive groups of seven binary pulses back to audio signals corresponding to the audio signals at the transmitter, and which expand the converted signals to compensate for the compression that took place at the transmitter. These expanded audio signals are then applied to voice channel gates 26 which, with signals from the timing circuits 22, demultiplex the audio signals back to their respective voice channels 1 through 36. The binary pulses of Channel 37 are supplied by the decoder 24 to signal gates 25 which, with signals from the timing circuits 22, provide signals for the respective voice channels 1 through 36. FIG. 1 shows the transmitter and receiver for only one terminal. Persons skilled in the art will appreciate that the transmitter of FIG. 1 would be used with a distant receiver, and that the receiver of FIG. 1 would be used with a distant transmitter. The distant transmitter and receiver would be respectively connected to the receiver and transmitter of FIG. 1 by two separate communication links, such as two pairs of wires.

Figure 2:
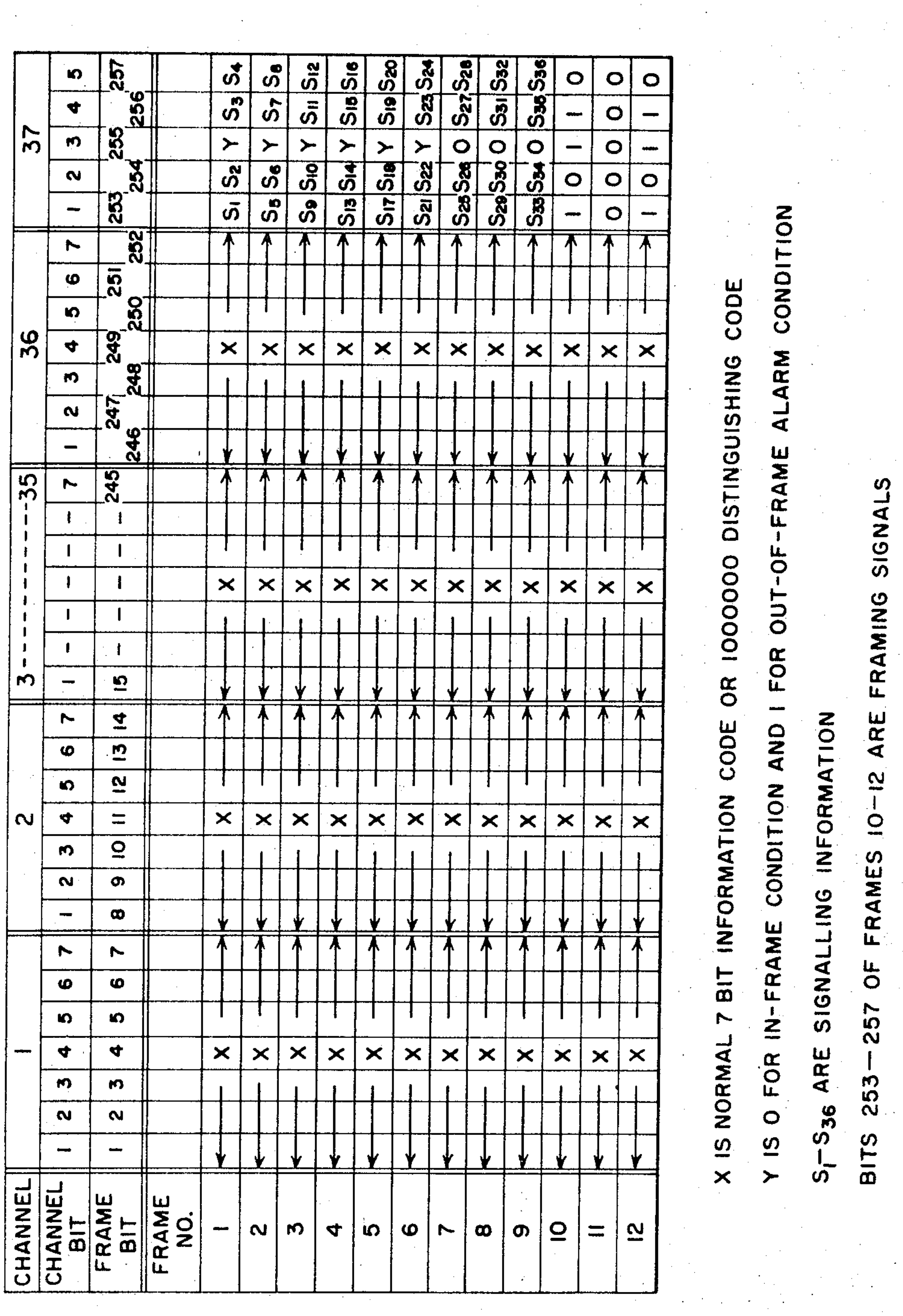
FIG. 2 shows a table giving the makeup of the channels in each of the 12 frames forming a super frame in the system of FIG. 1.

FIG. 2 shows a table giving the makeup of the 37 channels in each of the 12 frames forming a super frame. In the top horizontal line, channels 1 through 37 are indicated. Since the makeup of the voice channels is the same, channels 3 through 35 are not shown in detail, as indicated by the dashed line. In the next horizontal line, the seven digits or bits needed to encode the sampled amplitude are indicated. It will be noted that each of the voice or information channels 1 through 36 comprises seven such digits or bits. The 37th channel (for signalling, alarm, and framing) comprises only five digits or bits. In the third horizontal line, the frame bit numbers are indicated for the channels. It should be noted that each frame comprises 257 bits; bits 1 through 252 are for the 36 voice channels, and bits 253 through 257 are for the signalling, alarm, and framing channel 37. Below the third line in the left-hand column, the frame numbers 1 through 12 are indicated. In the vertical columns under the voice channels, the bits are marked by an "X" which indicates that the bits may be either a 1 or a 0 in whatever combination is needed to encode amplitude levels 0 through 127. As will be explained in more detail subsequently, all 36 channels may have a distinguishing code comprising a 1 followed by six 0's in all 12 frames to provide grouping and framing in accordance with our invention. Channel 37 has a different makeup. Channel bit 3 of Channel 37 or frame bit 255 is marked by a "Y" for the first six frames. This "Y" is a 0 when the system is in frame, but is a 1 when the system is out of frame. Channel bit 3 of Channel 37 (frame bit 255) of frames 7, 8, and 9 is preferably always 0. Channel bits 1, 2, 4, and 5 of Channel 37 (frame bits 253, 254, 256, 257) of the first nine frames respectively indicate the signalling information for the 36 channels as indicated by the designation S1 through S36. These bits are either a 1 to indicate a signal, or a 0 to indicate no signal. Generally, only one bit per channel per super frame is needed in order to provide the necessary signalling, since a super frame is repeated every 1.5 milliseconds. This is shown by the following calculation:

$$\frac{275 \text{ pulses/frame} \times 12 \text{ frames/super frame}}{2{,}056{,}000 \text{ pulses/second}} = 1.5 \text{ milliseconds/super frame}$$

In frames 10, 11, and 12, bits 1 through 5 of Channel 37 or frame bits 253 through 257 are used for system framing. These bits may have various logic sequences, but a preferred sequence (1 0 1 1 0, 0 0 0 0 0, and 1 0 1 1 0) is given in FIG. 2. With reference to FIG. 1, the receiver is provided with a frame error detector 28 which looks for this sequence. If this sequence is not received in frames 10, 11, and 12 of Channel 37, the frame error detector 28 produces an error signal which operates an alarm circuit 19 and a distinguishing code circuit 31. The alarm circuit 19 causes its local transmitter to send an alarm to the distant receiver. This alarm is indicated by a 1 at the bits marked with a "Y" in FIG. 2. In accordance with our invention, this alarm is sensed by a distant alarm detector 30 which causes the distinguishing code circuit (at the distant transmitter) to send the distinguishing code of 1 0 0 0 0 0 0 continuously in all 36 voice channels. The error signal from the frame error detector 28 can also cause the distinguishing code circuit 31 to send the distinguishing 1 0 0 0 0 0 0 binary code in all 36 channels of frames 1 through 12 in case the distant receiver is out of frame.

The framing code used in Channel 37, frames 10, 11, and 12, is therefore readily distinguishable from the voice channels, so that synchronization, including proper grouping, can be quickly achieved. Provision of a separate Channel 37 for signalling, alarm, and framing is an important feature in that it permits the 36 voice channels to have only voice information, and hence provides a high quality system of 36 voice channels with a line rate of 1.542 million pulses per second.

FIG. 3 shows the binary-ternary conversion code which is used. This code is used in the 4-to-3 converter 20 of the transmitter to convert binary bits or pulses to ternary bits or pulses; and is used in the 3-to-4 converter 23 in the receiver to convert ternary pulses back to binary pulses. As explained earlier, the pulses supplied by the combiner 18 in the transmitter are a stream of binary pulses having a rate of 2.056 million pulses per second. These binary pulses are placed in groups of four pulses, and each group of four binary pulses is converted to a corresponding group of three ternary pulses so that the line frequency is reduced. At the receiver, the ternary pulses are placed in the same corresponding groups of three, and each group of three ternary pulses is converted back to binary pulses in the same corresponding groups of four. It is, of course, very important that the proper grouping be made so that correct decoding is provided. Otherwise, the information will be lost. In FIG. 3, the first vertical column shows binary groups of four pulses in all 16 possible combinations between four 0's and four 1's. In the next two vertical columns, the corresponding ternary groups of three pulses are shown. These next two columns show a positive mode and a negative mode, since it is desirable that the net polarity weight (i.e., positive and negative), remain as near zero as possible. This is to insure that any transformers in the communication link have as little direct current as possible applied to them. The positive mode is used if the prior net polarity weight is negative, and the negative mode is used if the prior net polarity weight is zero or positive. For example, a binary group of four 0's is converted to a ternary group of 0 + 0 in the positive mode, or 0 − 0 in the negative mode, depending upon what the net polarity weight was just prior to the appearance of that binary group of four 0's. If the prior net polarity weight was negative, then the positive ternary mode of 0 + 0 would be used. If the prior net polarity weight was zero or positive, then the negative ternary mode of 0 − 0 would be used. The last vertical column shows the net polarity weight provided by each of the ternary groups. Thus, for the binary group of four 0's, the ternary group has a polarity weight of 1 (either a plus or a minus, depending upon which mode is selected). At the receiver, the ternary groups are converted back to their corresponding binary groups as also indicated in FIG. 3. From FIG. 3, it will be seen that proper synchronization and grouping of the ternary pulses at the receiver are absolutely essential in order to get accurate (or any) information after decoding.

Figure 4:
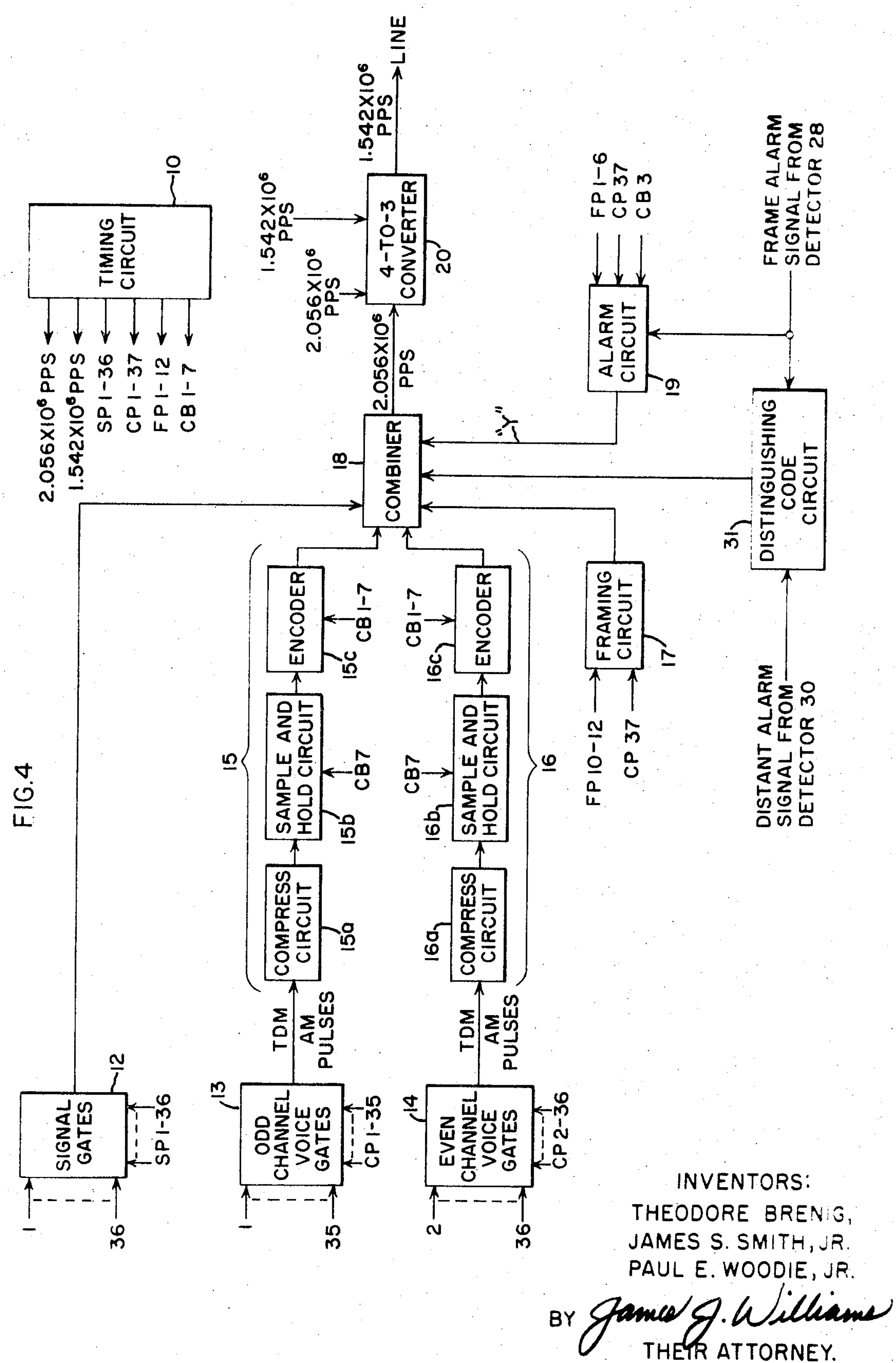
FIG. 4 shows a more detailed block diagram of the time-division multiplex, pulse-code modulation transmitter of FIG. 1.

FIG. 4 shows a more detailed block diagram of the TCS–27 system transmitter for multiplexing, encoding, and transmitting signals to a system receiver. In FIG. 4, the blocks corresponding to those shown in FIG. 1 have the same reference numerals. The timing circuit 10 generates the indicated signals, namely: the 2.056 million pulses per second; the 1.542 million pulses per second, the signalling pulses SP–1 through SP–36 at the appropriate time in Channel 37 of frames 1 through 9 (as shown in FIG. 2); the channel pulses CP–1 through CP–37 at the appropriate times and for the appropriate durations (as shown in FIG. 2); the frame pulses FP–1 through FP–12 at the appropriate times and for the appropriate durations (as shown in FIG. 2); and the individual channel bits CB–1 through CB–7 for channels 1 through 36 and CB–1 through CB–5 for channel 37 (as shown in FIG. 2). These pulses or signals are applied to the places indicated in the transmitter. Thus, the signal pulses SP–1 through SP–36 are applied to the signal gates 12 so as to sequentially gate the signal information for channels 1 through 36 to the combiner 18 at the appropriate time in frame 37. The odd channel pulses CP–1 through CP-35 are applied to the odd-channel voice gates 13 to gate the odd voice channels at the appropriate time; and the even channel pulses CP–2 through CP–36 are applied to the even channel voice gates 14 to gate the even voice channels at the appropriate time. The voice channels are thus sequentially gated as time-division multiplex, amplitude-modulation pulses, and are applied to the compressor circuits **15*a*, 16*a* which, as explained, emphasize or increase the gain for low-amplitude signals relative to the high-amplitude signals. This has the effect of causing the low-amplitude signals to include more encoder steps and thereby make the encoding of these signals more correct. At the receiver, a corresponding decrease in gain of these low-amplitude signals must be provided to restore the signals to their original quality or condition. In the sample and hold circuits 15*b*, 16*b*, the compressed signals are sampled at the end of the compressed signal (such as by the channel bit CB–7), and this second sample is held for sufficient time so that it can be encoded. The encoders 15*c*, 16*c* measure the amplitude of the second sample, the encode this measured amplitude between 0 and 127 (0 represents the maximum negative amplitude; 64 represents zero amplitude; and 127 represents the maximum positive amplitude). The encoding is provided by the seven channel bits CB–1 through CB–7 which have numerical values or significances of 64, 32, 16, 8, 4, 2 and 1 respectively. The presence of a numerical value is indicated by a 1, and the absence of a numerical value is indicated by a 0. Each of the seven channel bits CB–1 through CB–7 for each of the channels 1 through 36 are sequentially applied to the combiner 18. After these bits for channels 1 through 36 (frame bits FB–1 through FB–252) are combined in sequence, they are followed by channel 37 bits CB–1 through CB–5 (frame bits FB–253 through FB–257). As explained earlier in connection with FIG. 2, Channel 37 has a varied makeup. Signalling information S–1 through S-36 for the 36 voice channels is provided during frame bits FB–253, FB–254, FB–256, and FB–257 of frames 1 through 9. Framing condition or alarm is provided during frame bit FB–255 of frames 1 through 6. Framing or synchronizing signals are provided during frame bits FB–253 through FB–257 of frames 10, 11, and 12. These signals of 1 0 1 1 0, 0 0 0 0 0, and 1 0 1 1 0 are provided by the framing circuit 17 during Channel 37 of frames 10, 11, and 12. The distinguishing code circuit 31 is connected to the combiner 18** to supply the 1

0 0 0 0 0 0 binary pulses of all voice channel pulses in response to either a distant alarm signal or to a flame alarm signal. The alarm circuit 19 is also connected to the combiner 18, and provides a signal designated "Y" at frame bit FB–255 of frames 1 through 6. This signal "Y" is a 0 is a 0 for no alarm, and a 1 for an alarm. The combiner 18 thus produces a stream of pulses as shown in FIG. 2 at a rate of 2.056 million pulses per second. These pulses are applied to the 4-to-3 converter 20 which groups each sequence of four binary pulses and, in accordance with the code shown in FIG. 3, converts these groups of four binary pulses to groups of three primary pulses at a rate of 1.542 million pulses per second. These pulses are then applied to the line. As pointed out earlier, this provides 36 voice channels in the same pulse rate required by the Bell Telephone T–1 System, but which provides only 24 voice channels.

Figure 5:
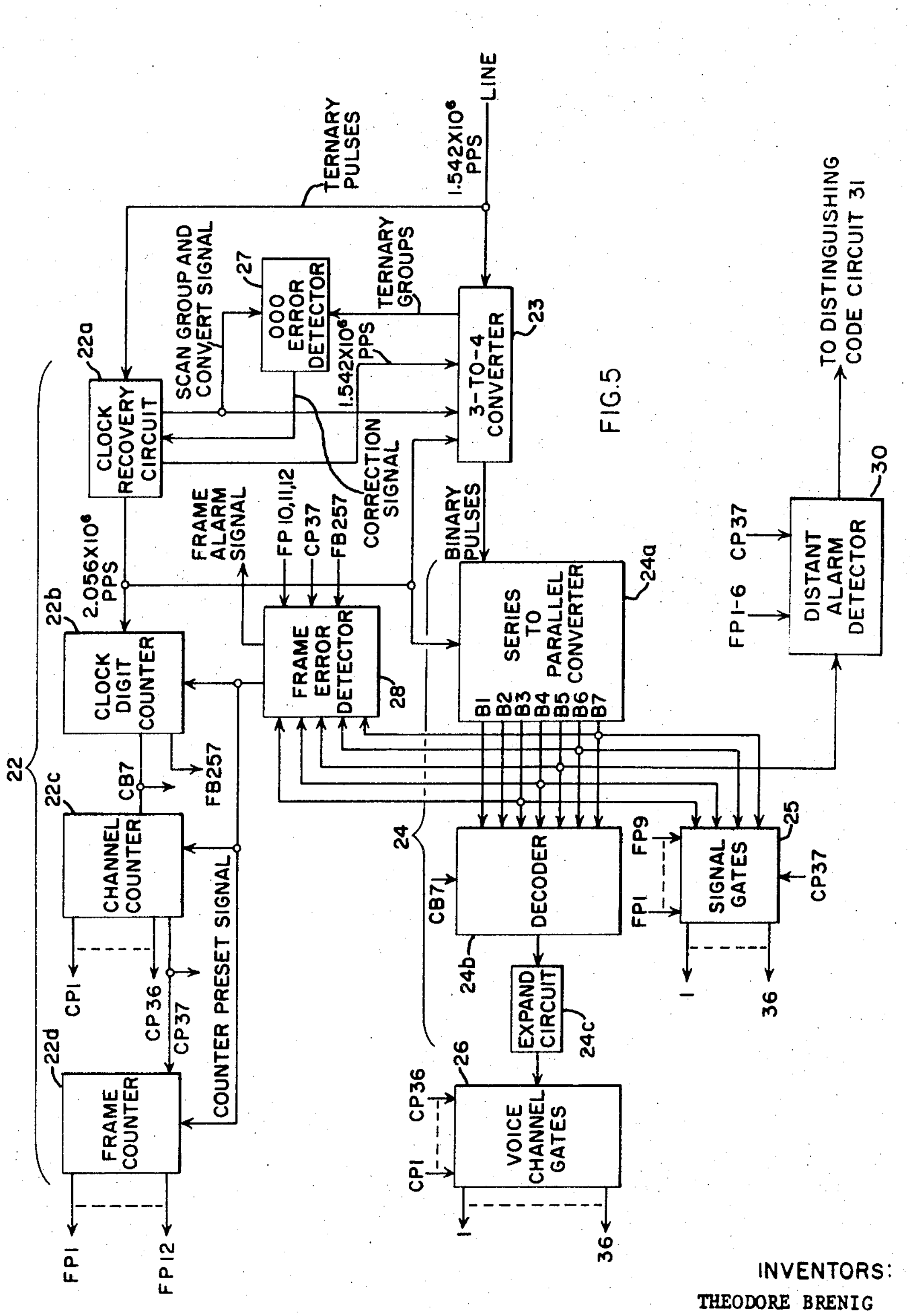
FIG. 5 shows a more detailed block diagram of the time-division multiplex, pulse-code modulation receiver of FIG. 1.

FIG. 5 shows a more detailed block diagram of the TCS–27 system time-division multiplex, pulse-code modulation receiver for receiving, decoding, and demultiplexing signals from a transmitter such as shown in FIG. 1. In FIG. 5, the blocks corresponding to those shown in FIG. 1 have the same reference numerals. The incoming ternary pulses, at a rate of 1.542 million pulses per second, are applied to the timing circuits 22 and the 3-to-4 converter 23. The timing circuits 22 actually comprise four separate or distinct circuits. The first circuit is a clock recovery circuit 22a which generates stable pulse trains of 1.542, 3.084, 6.168, and 2.056 million pulses per second (hereinafter sometimes referred to as 1.542, 3.084, 6.168, and 2.056 pulses) from the incoming ternary pulses. The 2.056 pulses are applied to a clock digit counter *22b* which counts these pulses in sequence, and produces timing channel bit CB–7 to represent each seventh channel bit, and produces timing frame bit FB–257 to represent each 257th frame bit. The timing channel bit CB–7 is applied to a channel counter *22c* which counts the bits CB–7 and produces channel pulses CP–1 through CP–37 in sequence. Each channel pulse CP–37 is applied to a frame counter *22d* which produces frame pulses FP–1 through FP–12 in sequence and with a duration of 257 frame bits to correspond with the frame times shown in FIG. 2. Thus, the timing circuits 22 produce all of the needed timing signals from the incoming ternary pulses. The incoming ternary pulses are also applied to the 3-to-4 converter 23. The converter 23 groups the pulses in the proper groups of three (i.e., as grouped at the distant transmitter), and in response to a scan group and convert signal along with the 1.542 and 2.056 clock pulses and logic circuits, converts each of these ternary groups to a group of four sequential binary pulses in accordance with the code in FIG. 3. The proper grouping of the ternary pulses is provided by a 000 error detector 27 which scans each group of ternary pulses in response to the scan group and convert signal from the clock recovery circuit *22a*, and in accordance with our invention, this is facilitated by the distinguishing code. As shown in FIG. 3, three consecutive zeros do not appear in any of the ternary codes. If three zeros are detected in a group, the detector 27 provides a correction signal that causes the clock recovery circuit *22a* to skip one clock count, which in turn causes the 3-to-4 data converter 23 to shift the grouping by one ternary pulse. If a ternary group of three zeros is again detected, another correction or shift is made. Since the ternary groups contain only three pulses, a maximum of two corrections or shifts is required, and one correction may provide the correct grouping. Three consecutive zeros were omitted from the ternary code for several reasons, namely the fact that unlimited sequences of zeros make it relatively difficult to reconstruct the clock signals, and the fact that three consecutive zeros can be used to indicate an error.

The binary pulses from the converter 23 are applied to the decoder and expand circuits 24, which actually include three circuits. The first is a series to parallel converter *24a* which receives binary pulses in sequence and places them in a seven-bit shift register. The seven bits are indicated as B–1 through B–7 and at the appropriate time, all seven bits are simultaneously but separately shifted into a decoder *24b* by the channel bit CB–7. After each seven bits B–1 through B–7 are shifted out of the converter *24a*, more binary pulses are sequentially applied to the shift register in the converter *24a*. The seven bits simultaneously applied to the decoder *14b* will, if the receiver is in frame or synchronization, have the same binary makeup as the corresponding seven pulses which encoded an amplitude pulse at the distant transmitter. These seven bits are converted to a single signal whose amplitude corresponds to the binary makeup of the seven bits. This single signal is then applied to an expand circuit *24c*. The expand circuit *24c* decreases the gain of the lower amplitude signals (by the same amount that the gain was increased by the transmitter compressor) so as to faithfully reconstruct the original voice signal. These voice signals are then applied to the voice channel gates 26, which, in response to the channel pulses CP–1 through CP–36, respectively gate the voice signals to the respective channels 1 through 36. The gates 26 may include hold circuits for each channel to provide a continuous voice signal from each gated signal until the succeeding gated signal is supplied (125 microseconds later).

Bits B–3 through B–7 (corresponding to the five channel bits CB–1 through CB–5 in Channel 37) are also applied to a frame error detector 28. The frame error detector 28 compares these five bits or digits in frames 10, 11, and 12 during the time of Channel 37, and if the binary sequence of 1 0 1 1 0 does not appear in Channel 37 of frame 10, or if the binary sequence of 0 0 0 0 0 does not appear in Channel 37 of frame 11, or if the binary sequence of 1 0 1 1 0 does not appear in Channel 37 of frame 12, the error detector 28 produces a frame alarm signal which is applied to the alarm circuit 19 and to the distinguishing code circuit 31 of the transmitter at the same location as the receiver to cause grouping, synchronizing, and framing in accordance with our invention. The detector 28 also produces a counter preset signal which causes the clock digit counter *22b*, the channel counter *22c*, and the frame counter *22d* to correct their count until these three binary sequences do appear in Channel 37 of frames 10, 11, and 12. A random or one-time error in transmission of the binary framing sequence is ignored by the error detector 28.

Signalling information is derived from bits B–3, B–4, B–6, and B–7 (corresponding to channel bits CB–1, CB–2, CB–4, and CB–5) during Channel 37 of frames 1 through 9, and this information is applied to the signal gates 25. The signal gates 25 supply this information to the proper channels 1 through 36 at times directed by frame pulses FP–1 through FP–9, and by channel pulse CP–37. As mentioned earlier, only one signalling pulse is provided for each channel during a super frame, but this is sufficient, since one super frame occurs during each 1.5 millisecond. This is ample for signalling, as typical telephone dialing signals last on the order of 40 milliseconds or longer.

SYNCHRONIZING SYSTEM — DESCRIPTION

The synchronizing system in accordance with our invention, which is included in FIGS. 1, 4, and 5, is shown in the functional diagram of FIG. 6. In FIG. 6, we have assumed that a near transmitter A, such as shown in FIG. 4, is transmitting to a distant receiver B, such as shown in FIG. 5; and that a distant transmitter B at the same location as the distant receiver B is transmitting to a near receiver A at the same location as the near transmitter A. In the first example in FIG. 6, we have also assumed that both receivers A and B are initially out of frame. Being out of frame, both receivers A and B produce a frame alarm signal which causes their respective transmitters A and B to send the distinguishing code in channels 1 through 36 and also the alarm signal (a logic 1 during frame bit FB–255 of frames 1 through 6). As will be explained in connection with FIG. 7, this distinguishing code facilitates ternary grouping; and after the correct ternary grouping is achieved, the distinguishing code makes the binary framing signals (in Channel 37 of frames 10, 11, and 12) more distinct. Each receiver is, of course, also receiving the distant alarm signal, but since each receiver is assumed to be out of frame, this received alarm signal may be ineffective. This condition continues until, as assumed in the second example, receiver B gets in frame. With receiver B in frame, its frame error detector 28 no longer produces a frame alarm signal. But being in frame, the distant alarm detector 30 in receiver B detects the distant alarm signal from transmitter A in the proper manner and so continues to send the distinguishing code to assist receiver A to get in frame. After some time (usually one superframe, which is 1.5 milliseconds), the receiver A will get in frame, and stop its transmitter A from sending the alarm signal (a logic 1 in frame bit FB–255 of frames 1 through 6). This causes transmitter A to resume sending voice information in place of the distinguishing code in channels 1 through 36, and causes transmitter B to resume sending voice information also. If a receiver gets out of frame again, it sends the distinguishing code and alarm signal, and the other transmitter sends the distinguishing code to get the out-of-frame receiver back in frame quickly.

Figure 7:
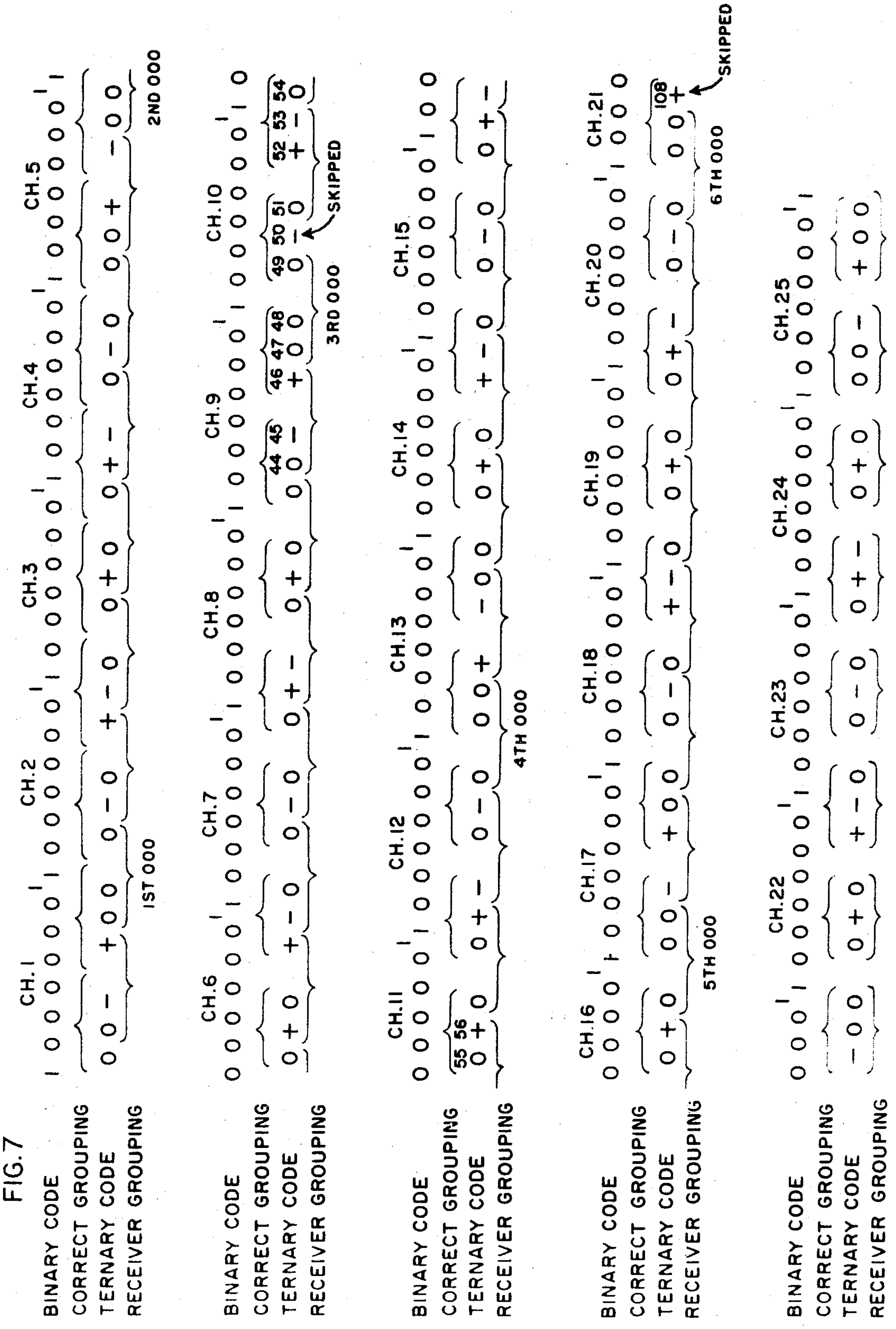
FIG. 7 shows the distinguishing code with corresponding binary and ternary pulses, and various groupings during synchronization being indicated.

In FIG. 7, we have shown the distinguishing code. In a preferred embodiment, this distinguishing code is the decimal number 64 which, in binary code, is represented by a 1 followed by six zeros. In FIG. 7, we have shown the first 25 channels of a frame, since this is a sufficient number to explain our synchronizing system. However, this distinguishing code will be sent in all 36 channels until grouping and framing are correct. In FIG. 7, the upper 1's and 0's show the distinguishing code in binary form; and the lower +'s, –'s, and 0's show the distinguishing code in ternary form as supplied by the transmitter. The conversion from each four binary pulses to ternary pulses is made in accordance with the code shown in FIG. 3.

The correct grouping for the receiver is indicated by the upper brackets in FIG. 7. In FIG. 7, we have assumed that the initial grouping missed the first ternary pulse, so that the last two ternary pulses of the first (correct) group and the first ternary pulse of the second (correct) group are grouped incorrectly as 0 – +. This, and subsequent incorrect groups are shown by the lower brackets. In the incorrect groups, a first set of three zeros, a second set of three zeros, and a third set of three zeros are indicated. The 000 error detector 27 of FIG. 5 supplies a correction signal after the third set of three zeros is detected, and as shown, ternary pulse 50 will be skipped so that another grouping is made. However, it will be seen that this is still not the correct grouping, so three additional sets of three zeros must be detected by the detector 27 before a second correction signal is supplied to cause ternary pulse 108 to be skipped. It will then be seen that the correct grouping is provided. With the correct grouping, the distant receiver can then get itself in frame, with the use of the framing signals in Channel 37 of frames 10, 11, and 12. After this, the distant transmitter ceases to send the frame alarm signal. The near transmitter then stops the 64 distinguishing code and resumes sending voice information.

It will thus be seen that we provide an improved synchronizing system which facilitates proper grouping of ternary pulses and system framing in a relatively short time. While we have described our synchronizing system in connection with a particular distinguishing code, it will be understood that other distinguishing codes may be used. Likewise, other alarm signals may also be utilized. Therefore, while our invention has been described with reference to a particular embodiment, it is to be understood that modifications may be made without departing from the spirit of the invention or from the scope of the claims.

What we claim as new and desire to secure by Letters Patent of the United States is:

1. In a multi-channel, time-division multiplex, pulse-code modulation carrier system having a near transmitter and receiver and a distant transmitter and receiver, wherein one of said channels contains alarm and framing signals, wherein each group of a first plurality of sequential binary pulses is converted in accordance with a selected code by a transmitter to a group of a second plurality of sequential ternary pulses for transmission, said code being selected so that a particular combination of ternary pulses is normally absent from each proper group of ternary pulses, and wherein the received ternary pulses are grouped and converted in accordance with said selected code by a receiver to binary pulses for decoding and demultiplexing, a synchronizing system comprising:

a. means at said near receiver for sensing said framing signals, for detecting framing errors of binary pulses, and for producing an alarm signal in response to a detected framing error;

b. means connected between said near receiver and transmitter for causing said near transmitter to transmit said alarm signal to said distant receiver;

c. means at said near receiver for detecting a received alarm signal from said distant transmitter;

d. means connected between said near receiver and transmitter for causing said near transmitter to transmit a distinguishing code in all but said one channel to said distant receiver in response to a detected distant alarm signal, said distinguishing code being such that it excludes said framing signals and being such that its corresponding ternary pulses have a plurality of said particular combinations;

e. and means at said near receiver for grouping received ternary pulses and for framing said near receiver with said framing signals.

2. The system of claim 1 wherein said alarm signal is produced only after an interval following a selected plurality of detected framing errors.

3. The system of claim 1 wherein said distinguishing code is transmitted during the time that information would normally be transmitted.

4. The system of claim 1 wherein said alarm signal is produced only after an interval following a selected plurality of detected framing errors, and wherein said distinguishing code is transmitted during the time that information would normally be transmitted.

5. The system of claim 1 and further comprising means connected between said near receiver and transmitter for causing said near transmitter to transmit said distinguishing code in all but said one channel to said distant receiver in response to an alarm signal produced by said near receiver.

6. The system of claim 5 wherein said alarm signal is produced only after an interval following a selected plurality of detected framing errors.

7. The system of claim 5 wherein said distinguishing code is transmitted during the time that information would normally be transmitted.

8. The system of claim 5 wherein said alarm signal is produced only after an interval following a selected plurality of detected framing errors, and wherein said distinguishing code is transmitted during the time that information would normally be transmitted.

* * * * *